United States Patent [19]

Taguchi et al.

[11] Patent Number: 5,307,896
[45] Date of Patent: May 3, 1994

[54] COLLISION DETECTION SENSOR

[75] Inventors: Masahiro Taguchi, Aichi; Motonori Tominaga, Okazaki; Toshiaki Matsuhashi, Gamagori, all of Japan

[73] Assignees: Nippondenso Co., Ltd., Kariya; Nippon Soken, Inc., Nishio, both of Japan

[21] Appl. No.: 928,475

[22] Filed: Aug. 12, 1992

[30] Foreign Application Priority Data

Aug. 13, 1991 [JP] Japan ................... 3-228461
Aug. 22, 1991 [JP] Japan ................... 3-235424

[51] Int. Cl.⁵ .............................. H01H 35/14
[52] U.S. Cl. ..................... 180/274; 280/735; 200/61.44; 200/61.08
[58] Field of Search ........... 280/735, 728 R, 730 R, 280/730 A; 200/61.08, 61.44, 343, 335, 61.62, DIG. 10, 61.43; 180/274; 296/146 C

[56] References Cited

U.S. PATENT DOCUMENTS

| 2,740,856 | 4/1956 | Doeg | 200/61.43 |
| 3,654,412 | 4/1972 | Haruna et al. | 180/274 |
| 3,794,794 | 2/1974 | Provancher | 200/61.53 |
| 4,052,579 | 10/1977 | Arthur | 200/343 |
| 4,966,388 | 10/1990 | Warner et al. | 280/730 A |
| 4,977,388 | 12/1990 | Park | 200/61.44 |
| 5,112,079 | 5/1992 | Haland et al. | 280/730 A |

FOREIGN PATENT DOCUMENTS

| 90/06247 | 6/1990 | European Pat. Off. . |
| 62-28655 | 2/1987 | Japan . |
| 63-125343 | 5/1988 | Japan . |
| WO90/6247 | 6/1990 | PCT Int'l Appl. . |
| 207630 | 11/1939 | Switzerland | 180/274 |
| 2225660 | 6/1990 | United Kingdom | 280/735 |

*Primary Examiner*—Karin L. Tyson
*Attorney, Agent, or Firm*—Cushman, Darby & Cushman

[57] ABSTRACT

A sensor that can rapidly and accurately detect a side collision of a vehicle. The sensor includes a fixed member in a vehicle door and a movable member that has an impact receiving part. The impact receiving part has a high rigidity outside of the fixed member. The impact receiving part also has energy absorbing parts with lower rigidity and a detection part arranged opposite to the movable member at a predetermined interval above the fixed member. When the impact receiving part receives an impact exceeding a predetermined valve, the energy absorption parts are deformed so as to move the movable member. This movement is then detected by the detection part.

4 Claims, 12 Drawing Sheets

1

COLLISION DETECTION SENSOR

BACKGROUND OF THE INVENTION

1. Field of the Invention

The present invention relates to a collision detection sensor of an air bag device used for protecting passengers mainly during a collision of a vehicle, from the side.

2 Description of the Related Art

Recently, vehicles have been equipped with air bag devices for protecting passengers from impact by detecting a collision and immediately providing an expanded air bag as a protection measure for passengers during a vehicle collision, in addition to a seat belt device.

The conventional air bag device for protecting passengers during a head-on collision is provided at the steering wheel or a part of the instrument panel in general, to reduce impact from the front. Recently however, combined use of an air bag device that is operated corresponding to a collision from the side has been examined in order to further improve safety during a collision, and for example, a collision detection sensor for detecting a side collision from the deformation of a vehicle door has been proposed.

As for the conventional example, a collision detection sensor was proposed in which two pairs of comb-shaped electrodes are used with their contact operation parts arranged alternately, and the sensor is operated only when at least one of the contact operation parts of the respective comb-shaped electrodes, that is, both pairs of the comb-shaped electrodes are turned on (PCT/WO90/06247).

However, as this sensor is operated only when an impact force is received on an area larger than a prescribed area, the sensor might not operate when a locally large load that should be regarded as a collision, such as a collision against a pole, is received.

Recently however, combined use of an air bag device that is operated corresponding to a collision from the side has been examined in order to further improve safety during vehicle collision. Thus, development of a detecting means that can assure accurate and prompt detection of a side collision is urgently required.

SUMMARY OF THE INVENTION

The objective of the present invention is to provide a collision detection sensor with a high degree of reliability that does not operate during local impact not regarded as a collision but operates during a collision on an area larger than a prescribed area or when a locally significant load that should be regarded as a collision is applied.

Another objective of the present invention is to provide a collision detection sensor that can assure accurate and prompt detection of a side collision.

The constitution and action of an embodiment of a collision detection sensor will be described referring to FIG. 1. A collision detection sensor according to the present invention is provided with a fixed member 24 fixed in a vehicle door and a movable member arranged outside the fixed member 24 that has an impact force receiving part 23 with high rigidity and energy absorption parts 21 and 22 with lower rigidity, and a detection part 25 is provided on the above fixed member 24 opposite the above movable member at a predetermined interval for detecting movement of the above movable member, and when an outer plate of the vehicle door is deformed by a collision and the impact is applied on the sensor as constituted above, the impact force is distributed over the whole surface of the energy absorption parts 21 and 22 through the receiving part 23. When the impact of the collision exceeds a predetermined load, the energy absorption parts 21 and 22 are deformed and the movable member is moved, and by this, the movable member compresses the above detection part 25, an ON signal is activated and a vehicle collision is detected.

The constitution and action of another embodiment of the above collision detection sensor according to the present invention will be described referring to FIG. 17. As for a collision detection sensor according to the present invention, as shown in FIG. 17, a pair of contacts 124a and 124b are arranged in parallel formation on a surface of the pressure receiving side of a fixed member 101 provided in a vehicle door, a plurality of elastic members 122b and 122c are arranged at a predetermined interval on an outer surface of a cover body 121 covering these contacts 124a and 124b, tip ends of the above plurality of elastic members 122b and 122c are alternately faced with the above pair of contacts 124a and 124b by guiding holes 123b and 123c provided on the above cover body 121, and the sensor has a low-load operation mechanism such that, when a vehicle experiences impact owing to a collision, more than one pair of the above elastic members 122b and 122c are elastically deformed and brought into contact with the above pair of contacts 124a and 124b so as to operate both, whereby the sensor is operated, and a high load operation mechanism, such that when a large load exceeding a set load of the cover body 121 is received, the cover body 121 is deformed or moved so as to operate both of the above pair of contacts 124a and 124b, and the sensor is operated.

When a vehicle experiences collision impact over an area larger than a prescribed area, more than one pair of the above elastic members 122b and 122c are elastically deformed and brought into contact with the opposing contact 124a or the contact 124b, respectively, and by this, the above pair of contacts 124a and 124b are turned on, and the sensor is operated. Also, when a large load exceeding a set load of the cover body 121 is received locally, as in the case of a pole collision, the cover body 121 is deformed or moved so as to operate both of the above pair of contacts 124a and 124b, and the sensor is operated.

However, when a locally small load not regarded as a collision is applied, as the above elastic members 122b and 122c are arranged at a predetermined interval, only one of said members are deformed at the most, whereby only one of the contacts 124a or 124b are turned on, and the sensor is not operated.

DESCRIPTION OF THE PREFERRED EMBODIMENTS

A preferred embodiment of the above-mentioned collision detection sensor according to the present invention will be hereinafter described in detail referring to attached drawings.

A collision detection sensor according to the present invention having a basic technical construction as mentioned above will be described in a more concrete exemplification. It is preferable that the above collision detection sensor in the above constitution is further constituted so that a guiding hole that leads said impact force receiving part to the above detection parts is provided at the above energy absorption parts, and a projection part projected into the above guiding hole is provided on the above impact force receiving part, and when the above impact force receiving part receives an impact force exceeding a predetermined value, the above energy absorption parts are deformed and the above projection part is brought into contact with the above detection part of the above impact force receiving part through the above guiding hole so as to detect a collision. Also, it is preferable that the above collision detection sensor is so constituted that a guiding hole that leads said impact force receiving part to the above detection part is provided at the above energy absorption part, and rod-state members having a length such that they are not in contact with said detection part are provided at the above guiding hole, and when the above impact force receiving part receives an impact force exceeding a predetermined value, the above energy absorption part is deformed so as to move the above movable member, and the above impact forced receiving part moves the above rod-state members in the above guiding hole so that the above rod-state members are brought into contact with the above detection part, whereby collision is detected.

Figure 1:
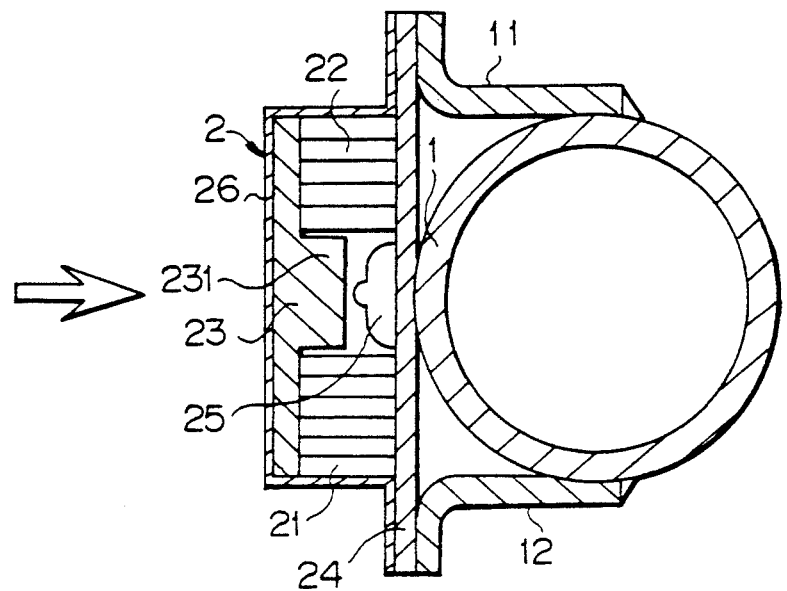
FIG. 1 is an overall sectional view showing a first preferred embodiment of a collision detection sensor in a first state according to the present invention.
Figure 2:
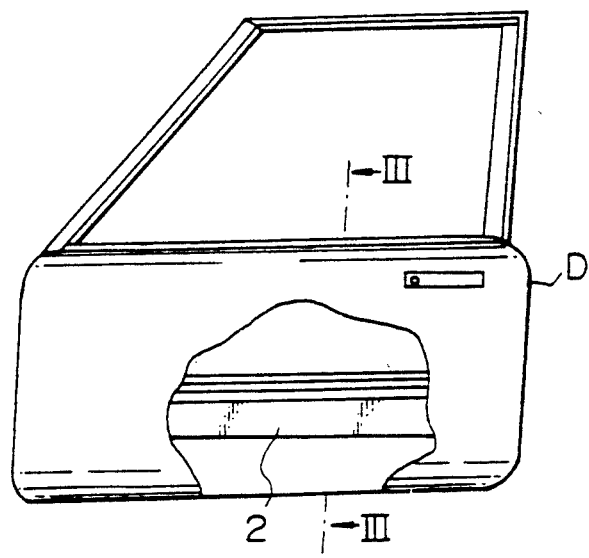
FIG. 2 is a front view of a side door of a vehicle.
Figure 3:
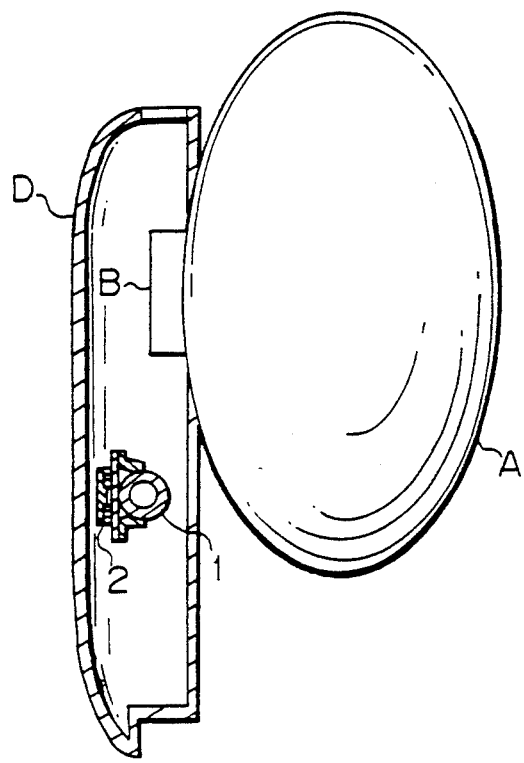
FIG. 3 is a sectional view taken along line III—III in FIG. 2.

FIGS. 1 to 4 show a preferred embodiment in a first state of the present invention, and a collision detection sensor according to the present invention is applied to an air bag device for a collision on a side of a vehicle. In FIGS. 2 and 3, a pipe-type side door beam (SDB) 1 extending in a horizontal direction is installed as a reinforcing material in a door D of a front seat of a vehicle and fixed to an inner wall of the door D by welding and so on.

A collision detection sensor 2 of the present invention is placed along on an outer circumferential wall outside the vehicle of the SDB 1. An inflator B for immediately sending gas into a bag A is placed above the sensor 2 in the door D, and FIG. 3 shows an inflated state of the bag A installed on the inflator B.

FIG. 1 is an enlarged sectional view of a sensor 2 that is fixed through upper lower edges of a base plate 24 by bolts and so on, not shown, on stays 11 and 12, and installed on the SDB 1 by welding. On the side opposite the SDB 1 of the above base plate 24, aluminum honeycomb constructions acting as energy absorption parts with relatively low rigidity (hereinafter referred to as aluminum honeycomb) 21 and 22, and a pressure receiving plate 23 acting as an impact force receiving part with high rigidity for distributing an impact force, from the direction shown by an arrow in the Fig., over the whole surface of the above aluminum honeycombs 21 and 22, are arranged so as to constitute a movable part 20. The above pressure receiving plate 23 has a projection part 231 at the center so that it is opposed at a predetermined interval to a known tape switch 25 as a detection part provided on the surface of the above base plate 24 between the above aluminum honeycombs 21 and 22. 26 is a cover made by a sheet metal or a resin that covers the surface of the above pressure receiving plate 23, the aluminum honeycombs 21 and 22 and the base plate 24.

Figure 4:
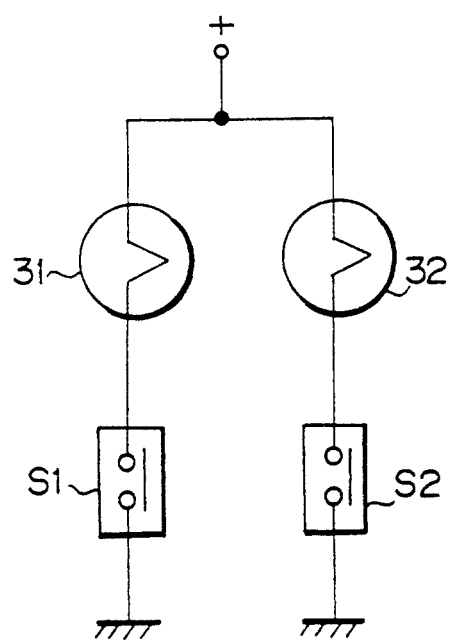
FIG. 4 is a system diagram showing an air bag device for a side collision, to which a collision detection sensor of the present invention is applied.

Action of the collision detection sensor of the above constitution will be hereinafter described. FIG. 4 is a system diagram showing an example of an air bag system on a front seat for a side collision, wherein a collision detection sensor S1 on the door of the driver's seat side is connected in series, with an ignition plug 31 of a driver's seat inflator, to a power source, while a collision detection sensor S2 on the door of the seat next to the driver is connected in series, with an ignition plug 32, to the power source, respectively.

In FIG. 1, when a vehicle, not shown, collides against a door on a driver's seat from the direction shown by an arrow (side collision), an outer plate of the door D is deformed and the impact is applied to the sensor 2. The impact force is distributed over the whole surfaces of the above aluminum honeycombs 21 and 22 through the pressure receiving plate 23 having the projection part 231. When impact during the collision is larger than a buckling load of the above aluminum honeycombs 21 and 22, the aluminum honeycombs 21 and 22 buckle, the above pressure receiving plate 23 is moved and the projection part 231 presses the above tape switch 25 so as to turn on the collision detection sensor S1 on the door of the driver's seat. Then, a current is conducted through the ignition plug 31 of the driver's seat inflator so that the air bag A is rapidly inflated to protect the passenger from a side collision.

In this way, according to this preferred embodiment, as it is constituted that the impact force is received over the whole surfaces of the aluminum honeycombs 21 and 22 arranged on the surface of the sensor through the pressure receiving plate 23 with high rigidity, the sensor is not operated by deformation as a result of a local load or a small load, e.g. the outer door surface being pushed by hand, but is operated only during a side collision that may cause injury to a passenger.

Figure 5:
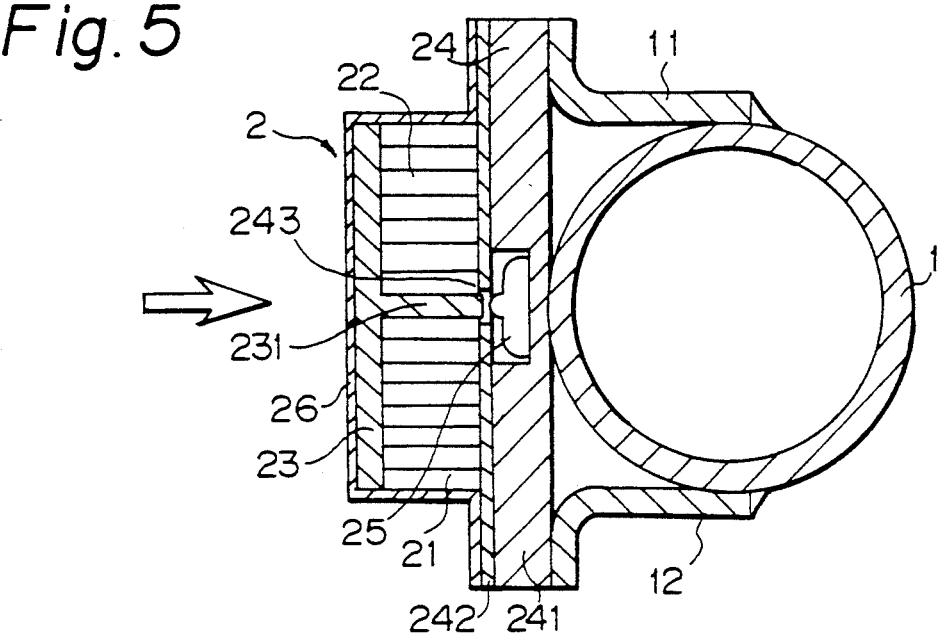
FIG. 5 is an overall sectional view of a sensor showing a second preferred embodiment of the present invention.
Figure 6:
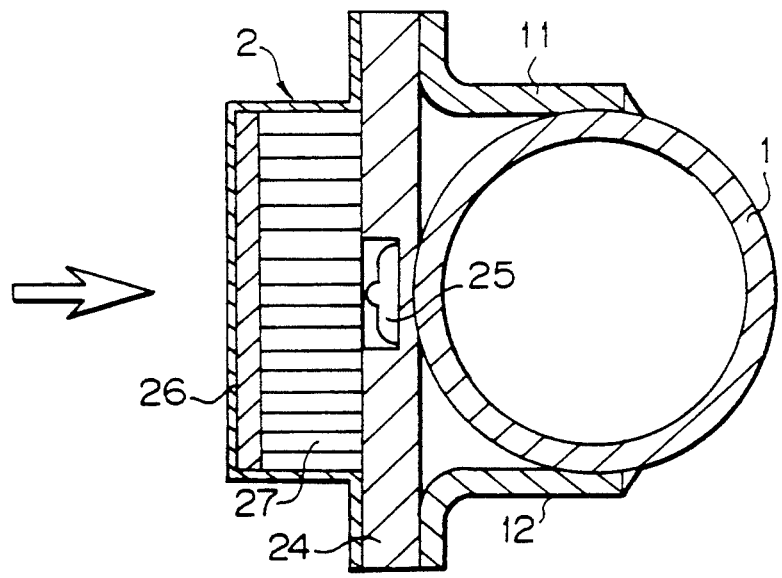
FIG. 6 is an overall sectional view of a sensor showing a third preferred embodiment of the present invention.
Figure 7:
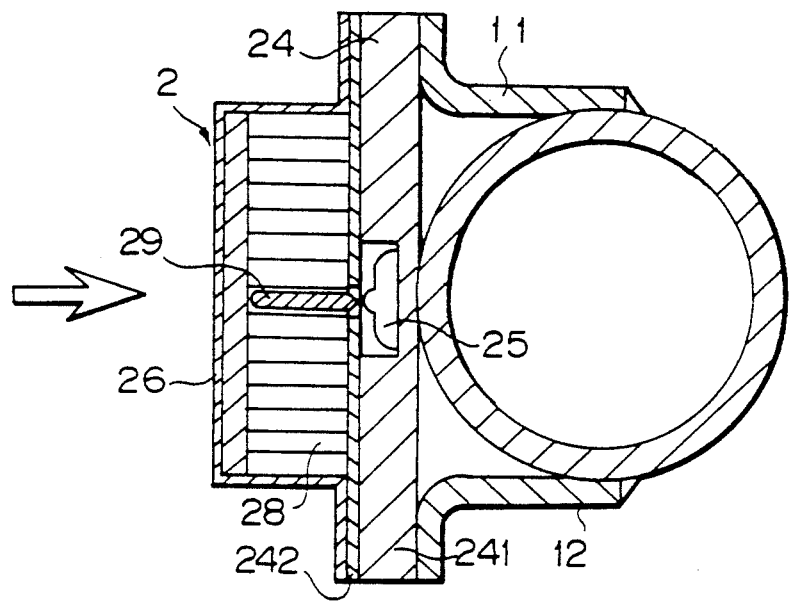
FIG. 7 is an overall sectional view of a sensor showing a fourth preferred embodiment of the present invention.

Second to fourth preferred embodiments of the present invention are shown in FIGS. 5 to 7, respectively. The second to the fourth preferred embodiments are also a door collision detection sensor using the same aluminum honeycombs as the first preferred embodiment for an energy absorption part, characterized by a structure such that the tape switch 25 for detecting an operation signal is pressed. The second to the fourth preferred embodiments are so constituted that the tape switch 25 is arranged in the base plate 24 below the aluminum honeycombs 21 and 22, and in the second preferred embodiment (FIG. 5), the base plate is a double-plate structure and the tape switch 25 is arranged on an inner plate 241 on the side of the SDB 1. On an outer plate 242, a guiding hole 243 is provided at a position opposite the projection part 231 of the pressure receiving plate 23 so that the above projection part 231 of the pressure receiving plate 23 presses the above tape switch 25 through the guiding hole 243.

In the third preferred embodiment (FIG. 6), the tape switch 25 is arranged on the base plate 24 so that it is opposed to the bottom surface of an aluminum honeycomb 27 and the buckled aluminum honeycomb 27 directly presses the tape switch 25. In the fourth preferred embodiment (FIG. 7), a plurality of rods 29 are fixed in a core of an aluminum honeycomb 28 by adhesion or the like so that said plurality of rods 29 press the tape switch 25 through the guiding hole 243 provided at the outer plate 242 of the base plate 24 in the double-plate structure. The structure and operation other than that is the same as the above first preferred embodiment.

Figure 8:
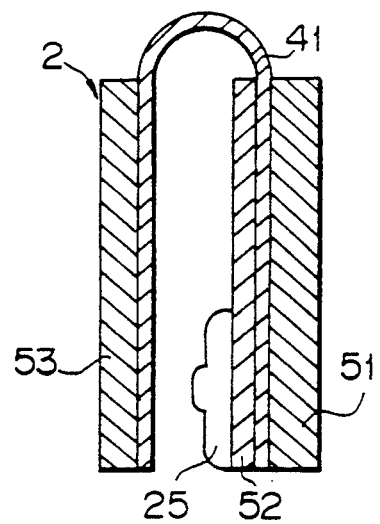
FIG. 8 is an overall sectional view of a sensor showing a fifth preferred embodiment of the present invention.
Figure 9:
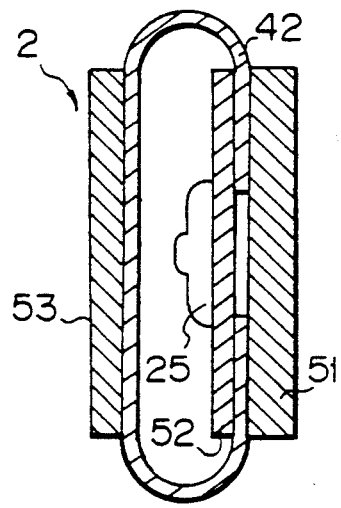
FIG. 9 is an overall sectional view of a sensor showing a sixth preferred embodiment of the present invention.

Fifth and sixth preferred embodiments of the present invention will be described referring to FIG. 8 and FIG. 9. The fifth preferred embodiment (FIG. 8) is a door collision detection sensor using a plate spring of a cantilever arc in which one of the side outer surfaces of a plate spring 41, with a cross section in the shape of an inverted U, is fixed on a base plate 51 as an energy absorption part instead of the honeycomb structure and the tape switch 25 is placed on its inner surface through a plate 52. On the other side outer surface of the above plate spring 41, a pressure receiving plate 53 with high rigidity is mounted, or, as in the sixth preferred embodiment (FIG. 9), a plate spring 42 of a twin-cantilever arc may be used. The plate springs 41 and 42 are assembled to the plates 51, 52 and 53 by welding, screwing or caulking.

An impact force is distributed over the whole surface of the plate springs 41 and 42, respectively, through the pressure receiving plate 53 with high rigidity. The impact load during a collision presses the plate springs 41 and 42 that press the tape switch 25, and the sensor is operated.

Figure 10:
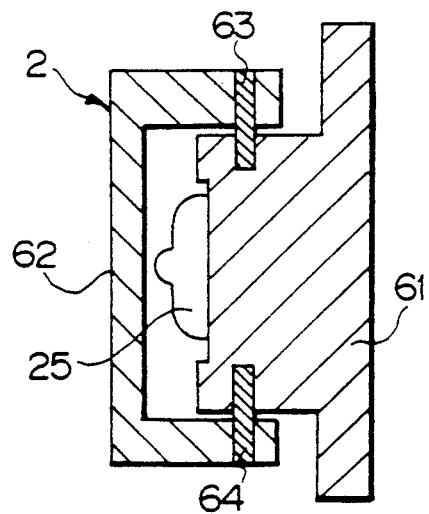
FIG. 10 is an overall sectional view of a sensor showing a seventh preferred embodiment of the present invention.

A seventh preferred embodiment of the present invention will be described referring to FIG. 10. This preferred embodiment is a door collision detection sensor using the shearing of a pin, and on a fixed member 61 with a projected cross section fixed on the SDB, not shown, a box-shaped movable member 62 opposite is locked by a plurality of pins 63 and 64. The tape switch 25 is mounted on the surface of the projection of the above fixed member 61, and the tape switch 25 is opposed to the back of the above movable member 62 at a predetermined interval.

An impact force during a collision is distributed over the whole surface of the movable member 62 with the outer surface of the above movable member 62 acting as a pressure receiving part, and when an impact load is larger than a set load, the plurality of pins 63 and 64 are sheared off and press the tape switch, whereby the sensor is operated.

Figure 11:
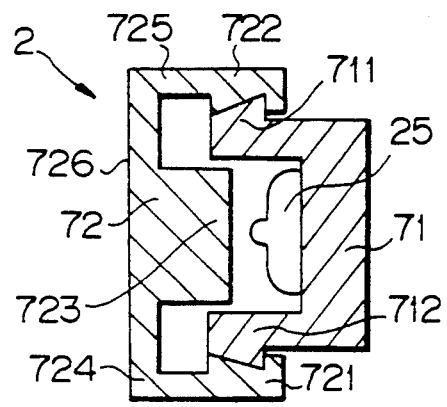
FIG. 11 is an overall sectional view of a sensor showing an eighth preferred embodiment of the present invention.

An eighth preferred embodiment of the present invention will be described referring to FIG. 11 and FIG. 12. This preferred embodiment is a door collision detection sensor using elastic deformation or plastic deformation of a cantilever, and as shown in FIG. 11, a fixed member 71 with a recessed cross section having claw parts 711 and 712 at both edges and a movable member 72 with a recessed cross section having claw parts 721 and 722 that are larger than the above claw parts 711 and 712, and in a shape corresponding to same, are engaged with the respective claw parts. The fixed member 61 is mounted on the SDB, not shown, and the tape switch 25 is fixed on the inner surface of the fixed member 61. A projection part 73 is formed on the above movable member 72 at the position opposite the above tape switch 25 at a predetermined interval. A side wall of the above movable member 72 continuing to the claw parts 721 and 722 are made as thin deformation parts 724 and 725 of the cantilever structure.

Figure 12:
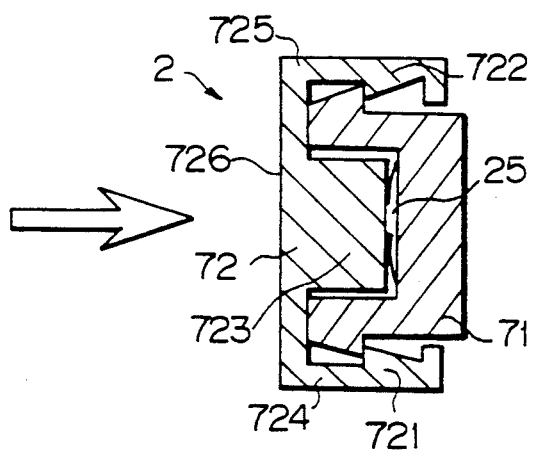
FIG. 12 is a view showing operation of a sensor in an eighth preferred embodiment.
Figure 13:
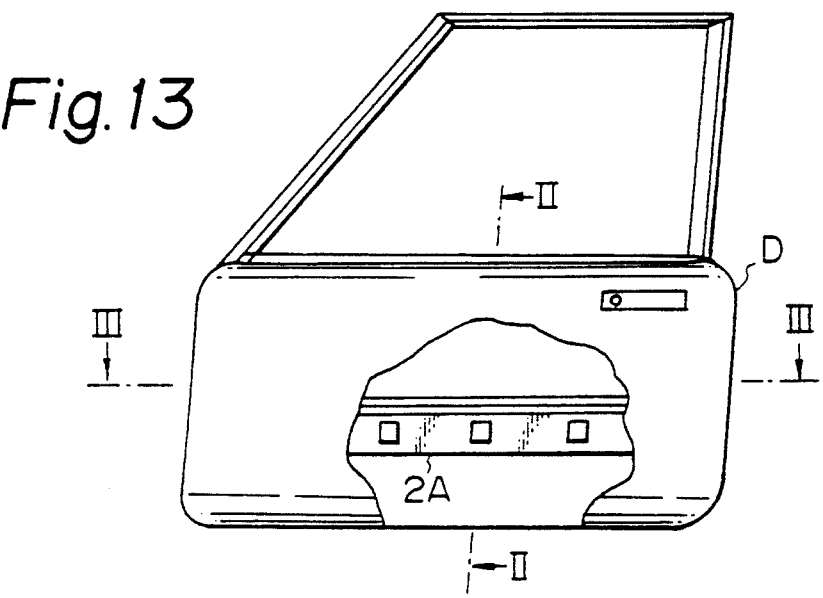
FIG. 13 is a front view of a side door of a vehicle regarding another preferred embodiment of a collision detection sensor according to the present invention.

The outer surface of the above movable member 72 is a pressure receiving surface 726, and when the pressure receiving surface 726 receives an impact force from the direction shown by an arrow as in FIG. 12, the impact force is distributed over the whole surface of the movable member 72, whereby the deformation parts 724 and 725 are deformed, and when an impact load is larger than a set load, the above claw parts 721 and 722 go beyond the claw parts 711 and 712 of the fixed member 71, and the movable member 72 is moved and the above tape switch 25 is pressed, whereby the sensor is operated.

A preferred embodiment of another state of a collision detection sensor according to the present invention will be described referring to FIG. 13 to FIG. 25. In a collision detection sensor according to the present invention, the above basic technical construction is further embodied, wherein, for example, a pair of contacts are arranged in parallel formation on a surface of a pressure receiving side of a fixed member provided in a vehicle door, and a plurality of elastic members are arranged at a predetermined interval on an outer surface of a cover body covering said contacts so that the tip ends of the above plurality of elastic members alternately face the above pair of contacts by guiding holes provided on the above cover body, and when a vehicle receives an impact force as a result of a collision, more than one pair of the above elastic members are elastically deformed and brought into contact with the above pair of contacts, and a low load operation mechanism that operates a sensor by operating both and a high load operation mechanism are provided such that the cover body is deformed or moved when a large load exceeding a set load of the cover body is received so as to operate both of the above contacts and thereby operate the sensor.

Figure 14:
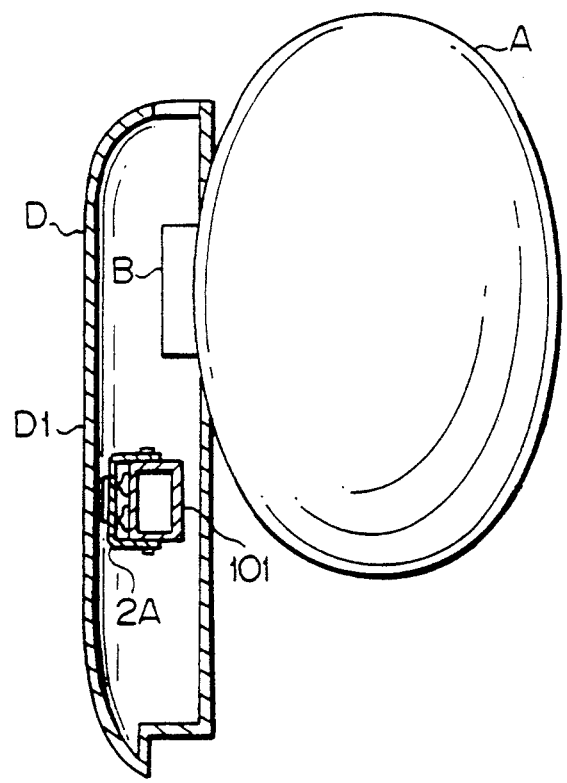
FIG. 14 is a sectional view taken along line II—II in FIG. 13.
Figure 15:
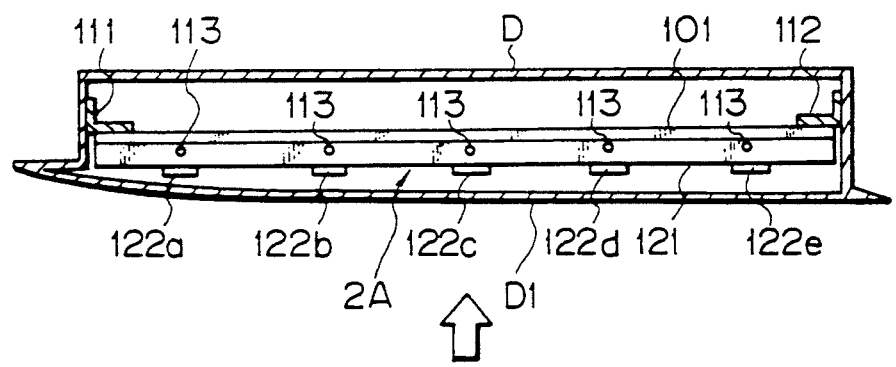
FIG. 15 is a sectional view taken along line III—III in FIG. 13.
Figure 16:
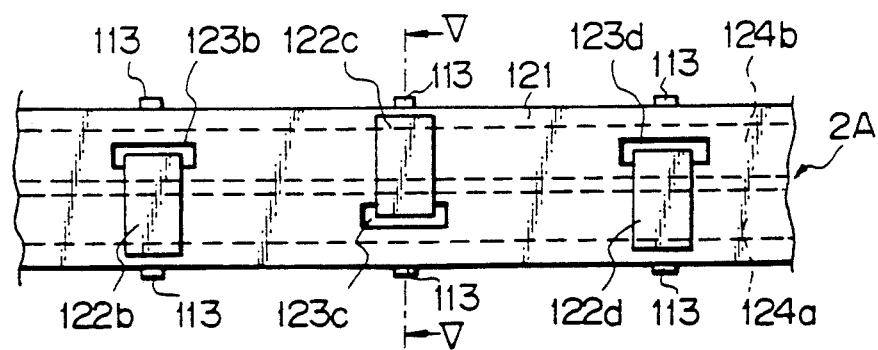
FIG. 16 is a partially enlarged view showing a collision detection sensor of a ninth preferred embodiment illustrating a second exemplification of the present invention seen from the side of a door outer plate.
Figure 17:
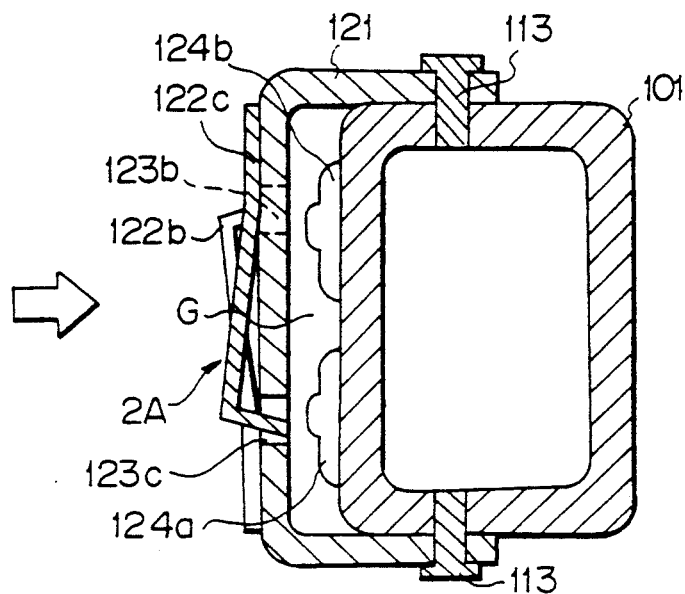
FIG. 17 is a sectional view taken along line V—V in FIG. 16.
Figure 18:
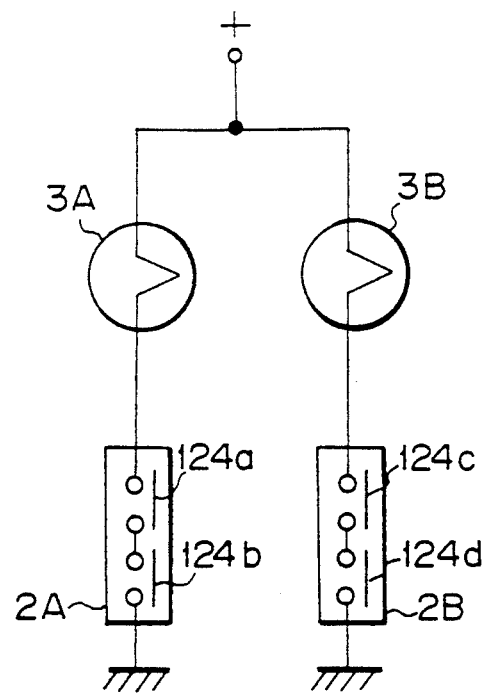
FIG. 18 is another system diagram showing an air bag device to which a collision detection sensor of the present invention is applied.

FIG. 13 to FIG. 17 are second preferred embodiments showing a second state of the present invention, that is, a ninth preferred embodiment such that a collision detection sensor of the present invention is applied to an air bag device for side collision. In FIG. 17 and FIG. 18, a side door beam (SDB) 101 as a fixed member extending in a horizontal direction and a collision detection sensor 2A constituted integrally with same are placed inside the door D of a vehicle front seat and fixed on an inner wall of the door D by welding or the like with stays 111 and 112 as shown in FIG. 15. In FIG. 14, the inflator B, for immediately sending gas into the air bag A, is placed above the sensor 2A in the door D, and the inflated state of the air bag A mounted on the inflator B is shown.

FIG. 16 is a front view of the sensor 2A seen from an outer plate D1 of the door, and FIG. 17 is a sectional view taken along line V—V of the FIG. 16. In the FIGS., a frame 121 as a cover body in the shape of a square without a side conforming to the outer surface of the SDB 1 is engaged on the outer door plate D1 side of the SDB 1 in the shape of a rectangular tube, and the frame 121 is mounted on the SDB 1 with, for example, a plurality of pins 113 made of aluminum. A predetermined gap G is provided between the above SDB 1 and the frame 121, and known tape switches 124a and 124b as a pair of contacts are arranged in parallel formation along the SDB 1 in the gap G and fixed on the outer surface of the above SDB 1 with an adhesive or a fixing jig, not shown. On an outer surface of the above frame 121, a plurality of spring plates 122a, 122b, 122c, 122d and 122e as elastic members are arranged at a predetermined interval (FIG. 15) and fixed by welding, caulking or the like. Spring plates 122a to 122e are arranged so that movable parts at the tip ends, which are bent in the shape of a hook, are alternately located above the tape switch 124a or the tape switch 124b (FIG. 16, FIG. 17) so that they are alternately opposed to the above tape switch 124a or the tape switch 124b through a plurality of guiding holes 123a to 123e (only 123b, 123c and 123d are shown in FIG. 16 provided on the outer surface of the above corresponding frame 121. And when external pressure is applied on the spring plates 122a to 122e during a collision, the movable parts at the tip ends are elastically deformed and brought into contact with the above tape switch 124a or tape switch 124b so as to turn them on. A shearing load of the above plurality of pins 113 are set larger than the load that turns on the tape switches 124a and 124b when external pressure is applied on the above spring plates 122a to 122e and deforms them.

Action of the collision detection sensor of the above constitution will be hereinafter described. FIG. 18 is a system diagram showing an example of an air bag system for a front seat side collision, and the door collision detection sensor 2A on the driver's seat, to which the tape switches 124a and 124b are connected in series, is connected in series, with an ignition plug 3A of a driver's a seat inflator, to a power supply, while the door collision detection sensor 2B, to which the tape switches 124c and 124d are connected in series, is connected in series, with an ignition plug 3B of an inflator on the seat next to the driver, to the power supply, respectively.

In FIGS. 15 to 17, when a vehicle, not shown, collides against a door of the driver's seat from the direction shown by an arrow (face collision), the outer door plate D1 is deformed and the impact is applied to the collision detection sensor 2A. In the case of a head-on collision where the impact force is significant either one of the adjoining pairs or more of the above spring plates 122a to 122e of the collision detection sensor 2A are deformed and the tape switches 124a and 124b are both activated, whereby the sensor 2A is turned on. When the collision detection sensor 2A is turned on, a current is conducted through the ignition plug 3A of the driver's seat inflator, and the bag A is inflated to protect a passenger from the side collision. In the case of a head-on collision where the impact force is smaller than a set value, a deformation amount of the spring plates 122a to 122e is small and the tape switches 124a and 124b are not turned on.

When a local load that is not regarded as a collision is applied, for example, when the door strikes an obstacle such as a streetlight upon opening the door when getting in or out, a load per unit area is larger than a head-on collision. However, as the spring plates 122a to 122e are arranged at a predetermined interval, only one of them is deformed at the most, and only one of the tape switches 124a or 124b is turned on, whereby the sensor 2A is not operated. However, when a locally large load that should be regarded as a collision, such as against a pole is applied, only one of the spring plates 122a to 122e are deformed, but a large load exceeding the shearing load of the plurality of pins 113 is applied to the frame 121 locked on the SDB 1 by the plurality of pins 113, and the plurality of pins 113 are sheared off and the frame 121 presses the tape switches 124a and 124b. Thus, the tape switches 124a and 124b are both turned on, whereby the sensor 2A is turned on.

Figure 19:
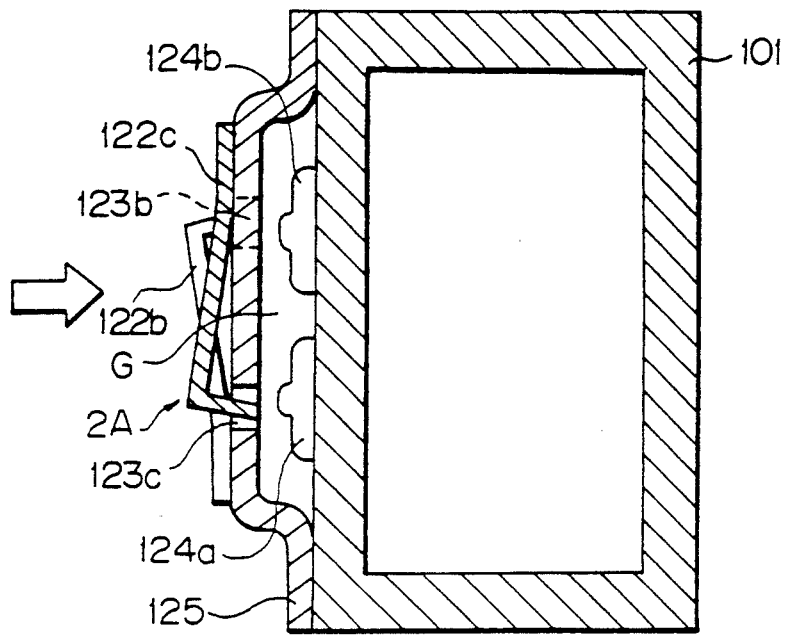
FIG. 19 is an overall sectional view showing a sensor of a tenth preferred embodiment of the present invention.

A tenth preferred embodiment of the present invention is shown in FIG. 19. The difference from the above ninth preferred embodiment is the way a load is received at the time of a pole collision, and this preferred embodiment is so constituted that a projected frame 125 is used and mounted on the outer wall of the SDB 1 by welding or the like. The other constitution is the same as that of the first preferred embodiment.

When a locally large load that should be regarded as a collision, such as a pole collision, is applied, only one of the spring plates 122a to 122e are deformed at the most, but the large load is applied on the above frame 125, and the frame 125 is plastically deformed so as to press the tape switches 124a and 124b. Thus, both tape switches 124a and 124b are turned on, and the sensor 2A is turned on. The other actions are the same as those of the ninth preferred embodiment.

Figure 20:
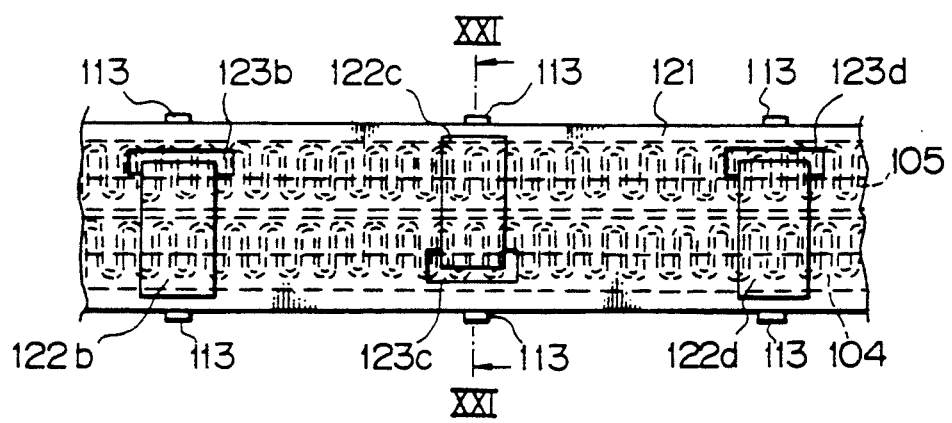
FIG. 20 is a partial enlarged view of a sensor of an eleventh preferred embodiment seen from the side of a door outer plate.
Figure 21:
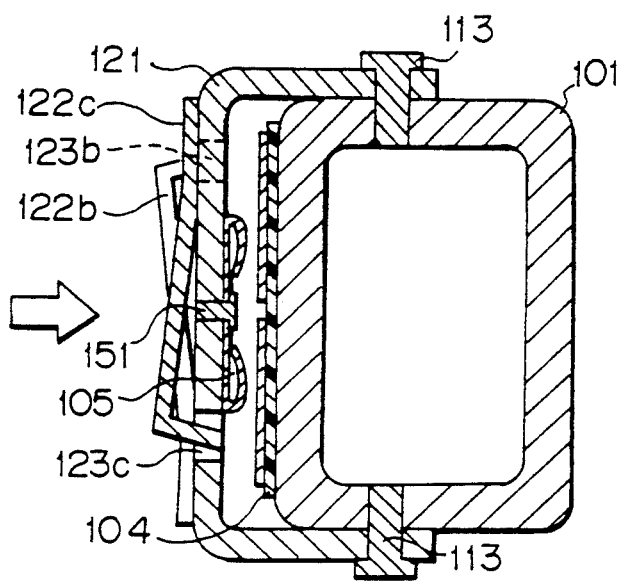
FIG. 21 is a sectional view taken along line IX—IX in FIG. 20.
Figure 22:
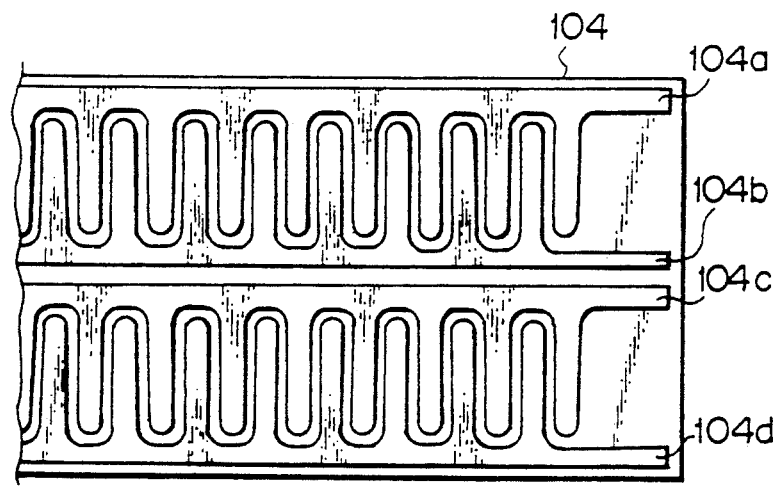
FIG. 22 is a partial enlarged view of a comb-shaped electrode in a twelfth preferred embodiment.

An eleventh preferred embodiment of the present invention will be shown in FIG. 20 to FIG. 22. Though tape switches are used for contacts of a collision detection sensor in the ninth and tenth preferred embodiments, a printed board on which a comb-shaped electrode is printed is used as a contact in this preferred embodiment. FIG. 20 is a view showing a sensor seen from the outer door plate D1 side and FIG. 21 is a sectional view taken along line IX–IX of FIG. 20, in which a print board 104 is fixed on the outer surface of the SDB 1, and two pairs of comb-shaped electrodes 104a and 104b and comb-shaped electrodes 104c and 104d are printed on a surface of the above print board 104 (FIG. 22). The SDB 1 is covered by the frame 121 from above the print board 104, and a conductive member 105 having a spring action is fixed with a plurality of pins 151 on the back of the above frame 121 at a position opposite the above comb-shaped electrodes 104a and 104b and the comb-shaped electrodes 104c and 104d.

The basic action is the same as that of the above preferred embodiment, and when a vehicle, not shown, collides against a door on the D side seat from the direction shown by an arrow (face collision), the outer door plate D1 is deformed and the impact is applied on the collision detection sensor 2A. When the impact of the collision is significantly large, either one of adjoining pairs or more of the spring plates 122a to 122e are deformed, and two pairs of comb-shaped electrodes 104a and 104b and comb-shaped electrodes 104c and 104d are shunted, whereby the sensor 2A is turned on.

When a locally large load, such as a pole collision, is applied, only one of the spring plates 122a to 122e are deformed at the most, but as a large load is applied on the frame 121 locked on the SDB 1 with a plurality of pins 113, the plurality of pins 113 are sheared off, the frame 121 is moved, and the conductive member 105 shorts the two pairs of comb-shaped electrodes 104a and 104b and comb-shaped electrodes 104c and 104d, respectively, whereby the sensor 2A is turned on.

Figure 23:
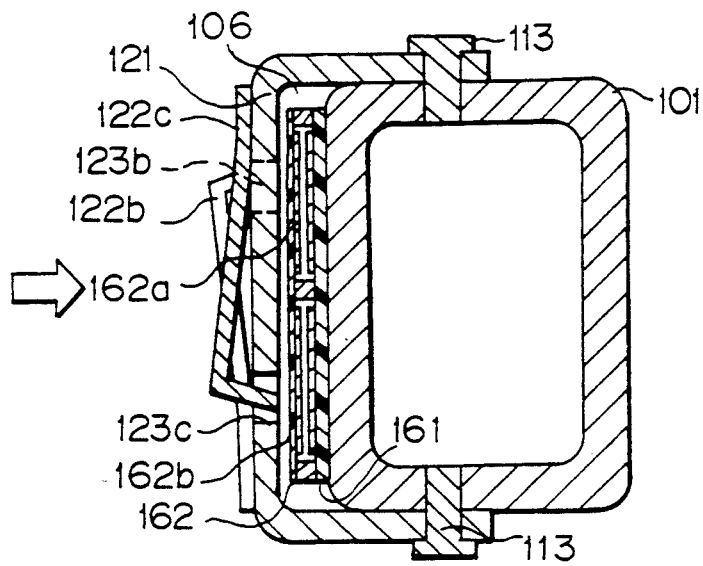
FIG. 23 is an overall sectional view of a sensor showing a thirteenth preferred embodiment of the present invention.
Figure 24:
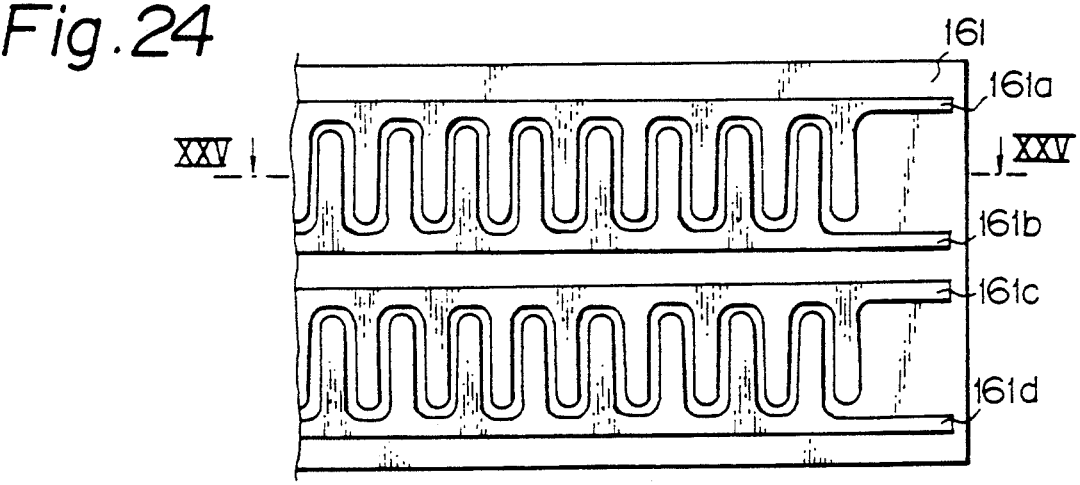
FIG. 24 is a partial enlarged view of a comb-shaped electrode in a fourteenth preferred embodiment.
Figure 25:
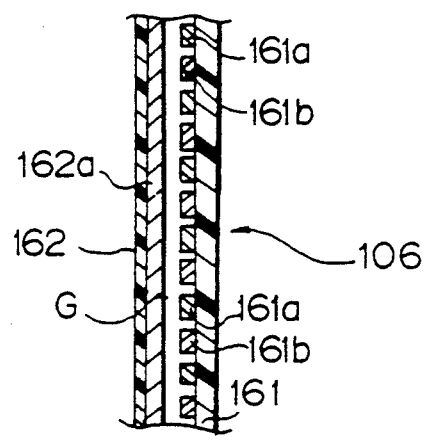
FIG. 25 is a sectional view taken along line XIII—XIII in FIG. 24.

A twelfth preferred embodiment of the present invention will be described in FIG. 23 to FIG. 25. This preferred embodiment also uses a print board on which two pairs of comb-shaped electrodes are printed as contacts. In this preferred embodiment, a contact 106 is constituted by a print board 161 and a print board 162 that are opposed to each other at a predetermined interval (FIG. 23), and the back of the above print board 161 is fixed on the outer surface of the SDB 1. Two pairs of comb-shaped electrodes 161a and 161b and comb-shaped electrodes 161c and 161d are printed on the above print board 161 (FIG. 24). On the print board 162, electrodes 162a and 162b for short-circuit are printed, and the above electrode 162a is opposite the comb-shaped electrodes 161a and 161b at a predetermined gap G (FIG. 25), while the electrode 162b is opposite the comb-shaped electrodes 161c and 161d.

The basic action is the same as the above preferred embodiment, and when a vehicle, not shown, collides against a door on the D side from the direction shown by an arrow (face collision), the door outer plate D1 is deformed and the impact is applied to the collision detection sensor 2A, and when the impact of the collision is significantly large, either one of adjoining pairs of spring plates 122a to 122e or more are deformed so as to press the print board 162, on which the electrodes 162a and 162b for short-circuit are printed, and so as to short the two pairs of comb-shaped electrodes 161a and 161b and comb-shaped electrodes 161c and 161d, respectively, whereby the sensor 2A is turned on.

When a locally large load such as a pole collision is applied, only one of the spring plates 122a to 122e are deformed at the most, but as the large load is applied on the frame 121 locked on the SDB 1 with a plurality of pins 113, the plurality of pins 113 are sheared off and the frame 121 is moved so as to press the print board 142 and short both pairs of comb-shaped electrodes 161a and 161b and comb-shaped electrodes 161c and 161d, respectively, whereby the sensor 2A is turned on.

As described above, the present invention is so constituted that an impact force received by a pressure receiving part is received over the whole surface of an energy absorption part, a collision detection sensor can be provided that is not operated by deformation by a local load or a small load e.g. the outer door face being pushed by a hand, but assures prompt and accurate operation only by a collision that may injure a passenger. Thus, it is highly practical and can be applied to an air bag device for a side collision so as to further improve passenger safety.

As a collision detection sensor according to the present invention has both a mechanism that operates a pair of contacts with a low load and a mechanism that operates contacts with a high load, it can assure operation as a result of any collision on an area larger than a prescribed area or a locally large load that should be regarded as a collision, but is not operated by a local impact that cannot be regarded as a collision. Thus, it is highly reliable and can be applied to an air bag device for a side collision so as to further improve a passenger safety.

We claim:

1. A collision detection sensor comprising:
   a fixed member fixed in a vehicle door;
   a low load operation mechanism in which a pair of detection parts are arranged in parallel formation on a surface of the pressure receiving side of said fixed member and a plurality of elastic members are arranged at a predetermined interval on a surface of a cover body covering said detection parts, and tip ends of said plurality of elastic members alternately face said pair of detection parts through said guiding holes provided at said cover body, and when a vehicle receives an impact force during a collision, more than one pair of said elastic members are elastically deformed and brought into contact with each of said pair of detection parts, whereby said detection parts are actuated; and
   a high load operation mechanism that is constituted so that when said cover body receives an impact force exceeding a predetermined value, said cover body is deformed or moved and brought into contact with each of said pair of detection parts, whereby said detection parts are actuated.

2. A collision detection sensor according to claim 1 wherein:
   said collision detection sensor is provided with a locking member that locks said cover body on said fixed member at a predetermined interval against said pair of detection parts; and
   when said cover body receives an impact force exceeding a predetermined value, said movable member is moved so as to shear off said locking member, whereby said detection sensor is actuated.

3. A collision detection sensor according to claim 1 wherein said pair of detection parts are constituted by comb-shaped electrodes.

4. A collision detection sensor according to claim 3 wherein said pair of detection parts are constituted by two pairs of comb-shaped electrodes arranged opposite each other at a predetermined interval.

* * * * *